(12) United States Patent
Puigardeu et al.

(10) Patent No.: US 9,390,352 B2
(45) Date of Patent: Jul. 12, 2016

(54) CONCURRENT IMAGE AND DIAGNOSTIC PATTERN PRINTING

(75) Inventors: Sergio Puigardeu, Barcelona (ES);
Angel Martinez, Barcelona (ES); M. Isabel Borrell, Barcelona (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1040 days.

(21) Appl. No.: 12/254,349

(22) Filed: Oct. 20, 2008

(65) Prior Publication Data

US 2009/0262380 A1 Oct. 22, 2009

Related U.S. Application Data

(60) Provisional application No. 61/046,887, filed on Apr. 22, 2008.

(51) Int. Cl.
*B41J 29/393* (2006.01)
*G06F 3/12* (2006.01)
*G06K 15/00* (2006.01)
*H04N 1/60* (2006.01)
*G06K 15/10* (2006.01)
*G06K 15/02* (2006.01)
*H04N 1/00* (2006.01)

(52) U.S. Cl.
CPC .......... *G06K 15/102* (2013.01); *G06K 15/005* (2013.01); *G06K 15/027* (2013.01); *H04N 1/00002* (2013.01); *H04N 1/0005* (2013.01); *H04N 1/00015* (2013.01); *H04N 1/00031* (2013.01); *H04N 1/00045* (2013.01); *H04N 1/00047* (2013.01); *H04N 1/00061* (2013.01); *H04N 1/00079* (2013.01); *H04N 1/00082* (2013.01); *H04N 1/00084* (2013.01)

(58) Field of Classification Search
USPC ............. 358/1.14, 1.15, 474, 1.1, 1.13, 1.16, 358/400; 399/9, 111, 119, 25; 345/619; 347/214
See application file for complete search history.

(56) References Cited

U.S. PATENT DOCUMENTS

| | | | |
|---|---|---|---|
| 5,613,160 A * | 3/1997 | Kraslavsky et al. ............ 710/16 |
| 6,295,071 B1 * | 9/2001 | Mikuni et al. ................ 345/619 |
| 6,556,792 B2 * | 4/2003 | Yoshimura ........................ 399/9 |
| 6,948,657 B2 * | 9/2005 | Sugino et al. ................. 235/436 |
| 7,031,012 B1 * | 4/2006 | Serizawa ..................... 358/1.16 |
| 7,299,990 B2 * | 11/2007 | Hoshina ........................ 235/492 |
| 7,782,498 B2 * | 8/2010 | Hoshi ........................... 358/474 |
| 2001/0016123 A1 * | 8/2001 | Yoshimura ...................... 399/25 |
| 2002/0126171 A1 * | 9/2002 | Subirada et al. ................ 347/19 |
| 2002/0135629 A1 | 9/2002 | Sarmast et al. |
| 2003/0001918 A1 | 1/2003 | Tsuchiya |
| 2003/0020776 A1 | 1/2003 | Franke et al. |
| 2003/0048320 A1 * | 3/2003 | Garcia .................. B41J 2/2132 347/16 |
| 2003/0085940 A1 | 5/2003 | Yamada |
| 2003/0122887 A1 | 7/2003 | Bland |
| 2003/0133162 A1 * | 7/2003 | Lupien, Jr. ............. H04N 1/387 358/3.26 |
| 2004/0032614 A1 * | 2/2004 | Tanaka et al. ................ 358/1.15 |
| 2004/0079800 A1 * | 4/2004 | Sugino et al. ................. 235/436 |
| 2004/0169694 A1 | 9/2004 | Yamada |
| 2004/0223017 A1 | 11/2004 | Otsuki |
| 2004/0223023 A1 | 11/2004 | Kim |

(Continued)

*Primary Examiner* — Marivelisse Santiago Cordero
*Assistant Examiner* — Moustapha Diaby
(74) *Attorney, Agent, or Firm* — Trop, Pruner & Hu, PC

(57) ABSTRACT

Print image-quality defects are diagnosed by printing an image and one or more diagnostic patterns concurrently.

20 Claims, 2 Drawing Sheets

(56) References Cited

U.S. PATENT DOCUMENTS

| | | |
|---|---|---|
| 2004/0244645 A1 | 12/2004 | Doi et al. |
| 2004/0246289 A1 | 12/2004 | Parnow |
| 2004/0252334 A1* | 12/2004 | Tanimoto et al. ............ 358/1.15 |
| 2005/0052488 A1 | 3/2005 | Inoue |
| 2005/0057598 A1 | 3/2005 | Endo et al. |
| 2005/0073547 A1 | 4/2005 | Endo |
| 2005/0156979 A1 | 7/2005 | Chang |
| 2005/0275865 A1* | 12/2005 | Lee .............................. 358/1.13 |
| 2006/0158475 A1 | 7/2006 | Arquilevich et al. |
| 2006/0176330 A1* | 8/2006 | Ito ........................... B41J 29/393 347/14 |
| 2006/0181716 A1* | 8/2006 | Hoshina ......................... 358/1.1 |
| 2006/0193013 A1* | 8/2006 | Hoshi ........................... 358/474 |
| 2007/0076038 A1* | 4/2007 | Plante ................... B41J 29/393 347/19 |
| 2008/0068169 A1* | 3/2008 | Hoshina ..................... 340/572.1 |
| 2008/0079763 A1* | 4/2008 | Abrott ................... B41J 29/393 347/19 |
| 2009/0033983 A1* | 2/2009 | Tanaka et al. ................ 358/1.15 |

\* cited by examiner

CONCURRENT IMAGE AND DIAGNOSTIC PATTERN PRINTING

CROSS REFERENCE TO RELATED APPLICATIONS

This Application claims the benefit of provisional patent application Ser. No. 61/046,887, filed Apr. 22, 2008, titled "CONCURRENT IMAGE AND DIAGNOSTIC PATTERN PRINTING" which application is incorporated by reference herein as if reproduced in full below.

BACKGROUND OF THE INVENTION

Printers are subject to occasional image quality (IQ) problems. The possible causes of the problems are dependent on the printing technology (e.g., inkjet, laser, thermal, dye-sublimation) involved. In some cases, the cause of the problem can be readily discerned from an image. For example, it may be apparent from an image that the source for the color yellow has been depleted. In other cases, the cause of the image-quality problem may not be readily apparent.

To facilitate diagnoses of image-quality problems, many printers provide for trouble-shooting procedures to help identify the problem source. One common approach is to make a test of print diagnostic patterns that can be examined to isolate potential sources of problems. For example, for a multi-nozzle inkjet printer, a pattern can consist of a series of lines, each to be formed using ink from a respective nozzle. A missing line can be used to identify a problematic (e.g., clogged) nozzle.

However, the test-print approach suffers from a number of limitations. In the first place, many image-quality problems are intermittent. Problems appearing in a user image may not be replicated in a test image, and vice-versa. Also, where a problem may have more than one source, some test procedures can yield confusing results, which can in turn lead to wasteful misguided attempts to solve the problem. What is needed is a more effective approach to identifying the source of an image-quality problem.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
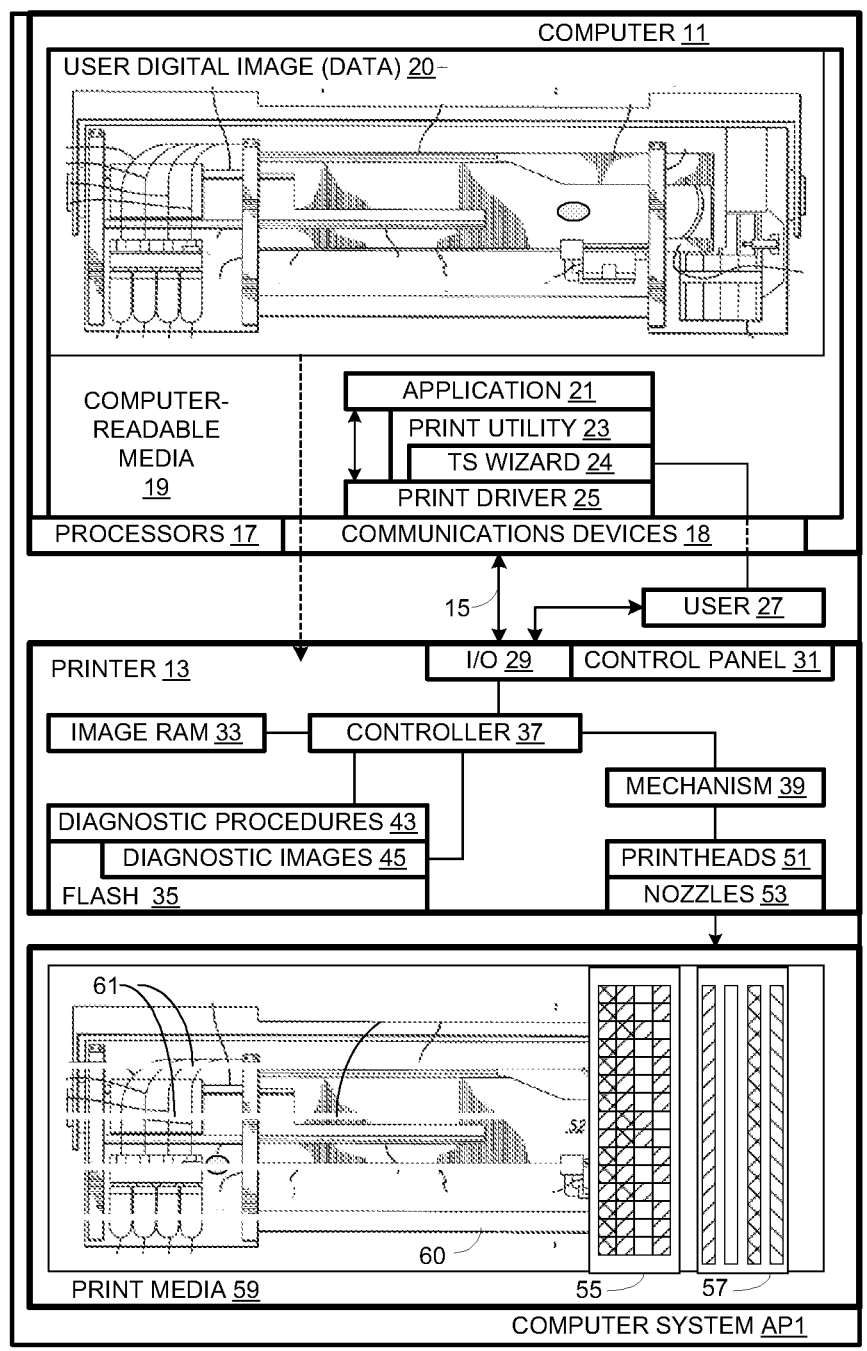
FIG. 1 is a schematic diagram of a computer system including a printer in accordance with an embodiment of the invention.

In the course of the present invention, it was recognized that differences in conditions between image printing and diagnostic printing can make it difficult to identify the cause of image-quality defects. Many image-quality defects do not occur under all conditions: for example, they may be "intermittent" or they may be mode dependent. In the latter cases, many inkjet printers have alternative throughput-versus-print-quality modes. Defects that show up in one mode might not appear in another. If the conditions or mode under which diagnostic patterns are printed do not match those of an image in which defects were detected, the results can be misleading.

The present invention provides for printing images concurrently with one or more diagnostic patterns to facilitate identification of a cause for a print image quality problem. By "concurrent" is met that at least part of a diagnostic pattern is printed between the times when the image begins printing and when printing of the image is completed. Printing the image concurrently with two or more diagnostic patterns permits ready comparison of two or more possible causes for an image-quality problem.

The image to be printed concurrently with diagnostic patterns can be a user image, e.g., a previously printed image for which the print manifested an image-quality problem. Alternatively, the image can be a pre-set image, e.g., one provided by the printer manufacturer for diagnostic purposes. The printer manufacturer can provide a single complex image to represent a range of print objects, such as text, line drawings, low-density fills, high-density fills, and gradients; alternatively, the printer manufacturer can provide a variety of diagnostic images, one of which can be selected as a function of a symptom description obtained from the user, e.g., through interaction with a software wizard. Pre-set images may be stored in the printer firmware or be provided as software with a print utility program. Some implementations of the invention do not provide for pre-set images, while other implementations only allow pre-set images. The illustrated embodiment allows both.

A "diagnostic pattern" is a non-representational pattern used for diagnostic purposes; it may contain textual material. As used herein, "image" denotes something that is representational, e.g., as a photograph represents its subject, and not merely a pattern or a pattern with text. A "diagnostic image" is tailored for diagnostic purposes. A "user image" is one selected by a user for purposes other than diagnosing image quality problems. For the typical case in which a printer prints on longitudinally advancing media, concurrent printing results in the diagnostic pattern having a media advance range that overlaps that of the image. As implied above, some aspects of the invention are applicable to printers in general, while others are specific to inkjet printers.

Printing an image concurrently with diagnostic patterns ensures that the image and diagnostic patterns are printed in the same print-quality mode, facilitating characterizing of problems that are dependent on a print-quality setting. In addition, the presence of an image alongside the diagnostic patterns can help detect whether the problem being diagnosed is still occurring; if the image-quality problem being diagnosed has temporarily stopped occurring, this is likely to show up in the image and affect the interpretation of the diagnostic patterns. Finally, where the image printed concurrently with the diagnostic image is a full user image, the invention provides for removing (e.g., by cutting the printed media) the diagnostic patterns from the image after printing, so that, for example, the diagnostic efforts need not significantly interrupt a multi-copy print run.

As shown in FIG. 1, a computer system AP1 includes a computer 11, an inkjet printer 13, and a communications link 15 over which computer 11 and printer 13 communicate. Computer 11 includes processors 17, communications devices 18, and computer-readable media 19, including solid-state and disk-based memory. Computer-readable media 19 can store a digital image 20, as well as an application 21 for creating or editing a digital image, a print utility 23 including a trouble-shooting (TS) wizard 24, and a print driver 25 for communicating with and controlling printer 13. By executing a print command, a user 27 can cause computer 11 to transfer digital image 20 to printer 13. "Coincidently" image 20 is of a large-format inkjet printer, similar to printer 13.

Printer 11 includes an input/output (I/O) port 29, a front panel 31, image RAM (random-access memory) 33, flash memory 35, a print controller 37, and a printer mechanism 39, the latter including a print head carriage, and print-handling mechanisms for handling print media 59 and printheads 51 including inkjet nozzles 53. Flash 35 is non-volatile memory that stores diagnostic (test) procedures 43 as well as diagnostic images 45, some of which serve double-duty as spitting images for exercising inkjet nozzles.

In the case of inkjet printer 13, media advances longitudinally and printheads 51 print in transverse swaths. In this case, concurrent printing can involve printing the diagnostic patterns alongside the image; i.e., so the media advance range of the patterns overlaps that of the image. This facilitates relating defects in the user image to defects indicated by diagnostic patterns. Two or more diagnostic patterns can be printed alongside an image to facilitate comparison of alternative possible causes of image-quality defects.

FIG. 1 shows two diagnostic patterns 55 and 57 that were printed on print media 50 concurrently with image 60. Print image 60 is a cropped instance of image 20 on print media 59 and is afflicted with unwanted white lines 61, representing an image-quality problem known as white-line banding. There is more than one possible cause of white-line banding-it can result from nozzle-related problems, e.g., some nozzles can be clogged, or it can result from media advance problems, e.g., if print media 59 advances too fast, some transversely extending areas might not be inked as the print heads move back and forth, leaving white line bands. Diagnostic pattern 55 is selected to detect media advance problems, while diagnostic pattern 57 detects nozzle-related problems. Comparison of these patterns with image 60 helps identify the root cause of the white line banding as explained in detail further below.

Where a user image is selected to be printed concurrently with diagnostic patterns, there may or may not be room for the full-unsealed user image. If there is room for the user image alongside the diagnostic patterns, it may be possible to cut the print media so as to separate the diagnostic patterns from the user image, leaving a usable hard copy user image. If the user image is too wide (relative to the media width) to allow the full image to be placed alongside of the diagnostic patterns, a user can be given options to scale or crop the user image for diagnostic purposes. In an alternative embodiment, diagnostic images are "laid over" the user image, which need not be cropped or scaled. Even though the test prints may not yield a useful hard copy image (due to cropping, scaling or overlaying), the juxtaposition of the image (in which the image defects were first detected) and the diagnostic patterns can facilitate identification of the cause of image-quality problems.

Where a user elects to crop an oversize image, wizard 24 can allow user 27 to select the portion of the image to be retained (e.g., to ensure the part most afflicted by image defects remains). In FIG. 1, cropped image 60 corresponds to the left-most portion (selected by default) of image 20. If instead, another portion of the image were retained, it would be shifted left to make room for diagnostic patterns 55 and 57 on the right.

Wizard 24 interacts with user 27 to obtain a description of the image-quality problem of concern to the user. Wizard 24 selects a default image as a function of this description. In many cases, the default image will be a user image stored in image RAM 33 (as it could be where multiple copies of an image are to be printed), under the assumption that the image-quality problem appears in that image. Where there is no image stored in image RAM 33, wizard 24 can select a preset image. In either case, wizard 24 allows user 27 to select an alternative to the default image.

Pre-set images 45 are provided by the printer manufacturer and stored in digital form in the printer firmware, e.g., in flash memory 35. Additional preset images can be provided with print utility 23 and thus stored on computer 11. Because they are pre-selected, pre-set images can be tailored for diagnostic purposes. Their content can be selected to expose image-quality problems. Also, their size can be selected so that no cropping or scaling is required. A pre-set image can be selected as a function of image-quality symptoms reported by a user, e.g., using trouble-shooting wizard 24. This allows an image designed to expose and emphasize the problems identified by a user with respect to a user image. Furthermore, a preset image can be selected to serve more than one purpose; for example, a diagnostic image can be a "spitting image", i.e., an image that exercises all nozzles 53 so that they do not get clogged due to non-use. This avoids a need for a spitting cycle into a spittoon on the side of the print media, thus saving ink and time.

Figure 2:
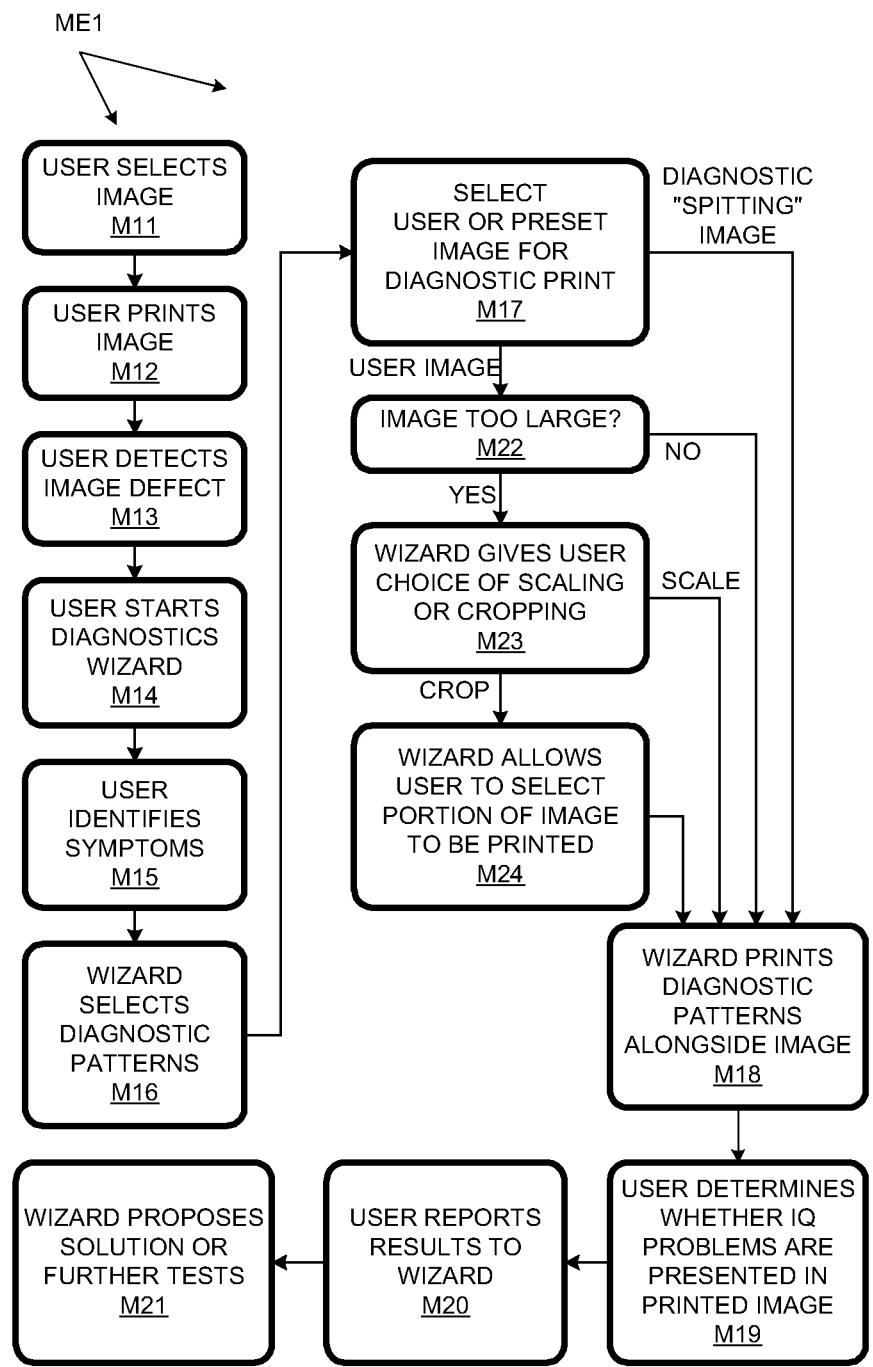
FIG. 2 is a flow chart of a method in accordance with an embodiment of the invention.

The present invention provides for a method ME1, flow-charted in FIG. 2, that can be practiced in the context of computer system AP1 in accordance with an embodiment of the invention. At method segment M11, a user selects a digital image, e.g., image 20. For example, this can be an image imported (e.g., from a scanner or digital camera), created, or edited using application 21.

At method segment M12, user 27 prints image 20. This can involve: 1) user 27 selecting a print command from a menu of application 17; 2) application 17 transmitting digital image data to print driver 25, 3) print driver 25 formatting digital image data 20 for use by printer 13; 4) print driver 25 transmitting print data to printer 25 to be stored in image RAM 33; 5) print controller 37 converting image data into swaths of print control data; and 6) print controller 39 transmitting the swaths of the print control data to printer mechanism 39 for creation of a printed image on print media.

At method segment M13, user 27 examines a printed version of image 20 and detects one or more image-quality problems. In the present case, the printed image is afflicted with white line bands, such as the white line bands 59 that will appear subsequently in cropped image 60. At method segment M14, user 27 initiates diagnostics by launching print utility 23 and trouble-shooting wizard 24. Alternatively, at method segment M13, user 27 can also initiate diagnostics from control panel 31 on printer 13.

At method segment M15, wizard 24 presents user with a menu of image-quality symptoms and user 27 responds by selecting descriptions that correspond to symptoms perceived by user 27. At method segment M16, wizard 24 selects a set of diagnostic tests to perform as a function of the identified symptoms. At method segment M17, wizard 24 and user 27 interact to select a user image or a preset image to be printed concurrently with diagnostic patterns. If a pre-set image is selected, wizard prints diagnostic patterns alongside the pre-set image at method segment M18.

After a diagnostic print is made at method segment M19, user 27 determines whether or not the image-quality problems are represented in the image printed alongside the diagnostic patterns. At method segment M20, user 27 can report results to wizard 24. Based on this feedback, wizard 24 can propose a solution (e.g., replace a print head or execute a calibration procedure for the media advance subsystem) or recommend further tests at method segment M21.

If, at method segment M17, a user image is selected, wizard 24 determines at method segment M22 whether the full image can fit alongside diagnostic patterns 48 and 49 on print media 47. If so, wizard 24 prints the user image with diagnostic patterns at method segment M18. If not, at method segment M23, wizard 24 presents user 27 with a choice of 1) scaling the image to fit with diagnostic patterns, or 2) cropping; user 27 then selects scaling or cropping.

If, at method segment M23, user 27 selects scaling, wizard 24 prints the scaled image concurrently with diagnostic patterns at method segment M18. If, at method segment M23, user 27 selects cropping, wizard 24 presents user 27 with a cropping window, at method segment M24. The cropping window provides a reduced size copy of the user image and a fixed-width selection window that the user can manipulate to select the portion of the user image to be printed alongside the diagnostic patterns. As a default, the selection window is set hard left so that the right end of the user image is to be cropped. In FIG. 1, printed image 60 is cropped at the right according to the default crop setting. Once user 27 has selected the portion of the user image to be printed, the selected portion of the image is printed alongside diagnostic patterns 55 and 57 at method segment M18. Again, once a diagnostic print is completed, user 27 can examine the image (M19) and diagnostic patterns and report back (M20) to wizard 24, which can propose solutions or further testing (M21).

Instead of using wizard 24, user 27 can initiate diagnostics from control panel 31 of printer 13 at method segment M14. User 27 can select a "test" option, which presents the choice of user image or pre-set image at method segment M17. If "pre-set image" is selected, a default spitting preset image is printed alongside diagnostic patterns at method segment M18. If "user image" is selected, a user image, cropped as necessary, in printer RAM 33 is printed alongside diagnostic patterns at method segment M18.

Inkjet printer 13, like many color inkjet printers, holds plural printheads 51 for providing different colors of ink (e.g., cyan, yellow, magenta, and black, and sometimes lighter versions of these). There can be several nozzles for each printhead.

Some image-quality problems are nozzle related. For example, a nozzle can get clogged so that ink fails to emerge or fails to transmit properly. Image pixels to be colored by a particular nozzle can remain white (or other paper color) or at least end up lighter than intended. If the problem nozzle is to be used continuously, the defect can show up as a horizontal white line across an image. Such a defect is referred to as "white line banding" or "white-line banding". Printed image 60 is afflicted with white-line banding, as white line bands 59 "afflict" image 60 as shown in FIG. 1.

White-line banding can result from other causes as well. For example, inkjet printers rely on predictable media advance. If the media advances more slowly than expected, some ink swaths will overlap causing darker-than-intended lines. If the media advances more quickly than expected, gaps may be introduced between swaths, resulting in white-line bands.

The fixes for nozzle-related white-line banding and media advance white-line banding are different. So when white line bands are detected, it is important to determine the cause of the problem. However, as noted in the following scenario, determining the cause of white-line banding without using the invention is not straightforward.

White-Line Banding Scenario without Concurrent Printing of Image and Diagnostic Patterns A user begins printing the first several of fifty copies of a computer-aided design (CAD) project with large-format inkjet printer 133. Because the user needs a good throughput and a reasonable image quality, user decides to use a "Plain Normal" print mode. After having printed ten copies of the project the user observes white-line banding in a gray-area fill. The user then decides to print a user diagnostic plot (without a concurrent image) to troubleshoot white-line banding. The user first inspects nozzle health.

When looking at a gray nozzle-health pattern (e.g., like the vertical stripes in diagnostic pattern 49), the user determines that some nozzles are not printing: The user assumes that gray-printhead-nozzle health could be a probable cause of white-line banding. After checking nozzle health, the user checks the alignment pattern, but does not see any discontinuity in the lines printed. The user correctly deduces that alignment is not the root cause of white-line banding. Finally, the user checks the paper advance diagnostic plot. In this case, the user does not see any evidence of white-line banding, and therefore concludes that media advance is not the root cause. From the diagnostic plot, the user concludes that the root cause for the white-line banding in the gray area was a nozzle health problem in the gray print head.

After triggering a print-head recovery routine from control panel 31, the user reprinted the plot, but white-line banding persists. The user replaces the gray printhead and reprints the plot again. The next diagnostic print shows that white-line banding persists.

The five gray nozzles not printing were not the cause of white-line banding. The printer had already detected these nozzles as faulty. The printer had a feature called ▫ Error Hiding ▫ that allows neighbor nozzles to replace faulty ones while printing.

Media advance problems caused the white-line banding. However, the diagnostic plot was printed in a "Best" print mode. This high-quality print mode performs more passes and can better hide media advance errors than the normal print mode the user chose to print the project. The user lost hours of time and the cost of a gray print head that did not fix the white-line banding problem.

White-Line Banding Scenario with Concurrent Printing of Image and Diagnostic Patterns If diagnostic patterns had been printed concurrently with an image, the user would have been able to quickly and correctly troubleshoot white-line banding. The image and diagnostic patterns are printed in the same print-quality mode as the image was when printed without the patterns.

Diagnostic pattern 55 is a "media advance interferential pattern", such as described in U.S. Patent Publication No. 2007/0076038. This pattern provides a visual and accurate measure of media advance errors. When the lighter patches are centered at the middle of the plot, media advance errors are low. When lighter patches are shifted to the right, media advance errors provoke white gaps between passes, that is, white-line banding. Where media advance errors are the worst, the lighter patches are shifted furthest to the right. White-line banding is most apparent in such media advance ranges.

Diagnostic pattern 57 is a nozzle health diagnostic plot. This diagnostic plot consists of solid bars printed with primary colors. Because bars are printed in the same print mode and with the same conditions (same Error Hiding) as the image, any nozzle health problems causing a defect in the printed image will show up as white gaps in diagnostic pattern 49. In this case, because nozzle health is not the cause of white-line banding, no white gaps appear.

With all this information it is straightforward for the user to understand that the root cause for the white-line banding seen in the print outs was due to media advance problems. By triggering a media advance calibration, white-line banding would have been fixed, saving time and the cost of a new print head.

Of course, if the cause of the white-line banding had been nozzle-related, the nozzle-health pattern would have white bands, the locations of which indicating which nozzles are problematic. For symptoms other than white-line banding, other diagnostic tests can be used. For other types of printers, e.g., laser printers and dye-sublimation printers, other sets of technologically appropriate tests can be used. These and other variations upon and modifications to the illustrated embodiment are provided by the present invention, the scope of which is defined by the following claims.

What is claimed is:

1. A method of diagnosing print image quality defects comprising:
    receiving, in a diagnostic user interface of a printer, a selection of an image;
    concurrently printing a media-advance pattern, a nozzle-health pattern, and the image on separate areas of a single print medium, wherein at least part of the media-advance pattern and at least part of the nozzle-health pattern are both printed on the single print medium between a first time when the image begins printing and a second time when printing of the image is completed;
    receiving, in the diagnostic user interface, results of a comparison by a user of the media-advance pattern and the nozzle-health pattern to the image concurrently printed on the single print medium; and
    based on the results of the comparison by the user of the media-advance pattern and the nozzle-health pattern to the image concurrently printed on the single print medium, presenting one or more solutions in the diagnostic user interface.

2. A method as recited in claim 1 wherein the media-advance pattern is a media-advance interferential pattern.

3. A method as recited in claim 1 wherein the one or more solutions include replacing a print head in said printer.

4. A method as recited in claim 1, further comprising:
    determining whether there is sufficient room to print the media-advance pattern, the nozzle-health pattern, and the image concurrently and on separate areas of the single print medium;
    if there is insufficient room to print the media-advance pattern, the nozzle-health pattern, and the image concurrently and on separate areas of the single print medium, scaling or cropping said original image, wherein the image that is printed is the scaled or cropped image.

5. A method as recited in claim 4 wherein said image is a spitting image for exercising all nozzles of a print head.

6. A method as recited in claim 1 further comprising printing the media-advance pattern and the nozzle-health pattern with respective media advance ranges overlapping an image media advance range of said image.

7. A method as recited in claim 6 wherein the media advance ranges of the media-advance pattern and the nozzle-health pattern overlap.

8. A method as recited in claim 1 wherein a portion of said image and a portion of said diagnostic patterns are printed in the same single pass of a print head, said pass being transverse with respect to direction of media advance.

9. A method as recited in claim 1 further comprising cutting the single print medium so as to further separate said image from said plurality of diagnostic patterns.

10. A printer comprising:
    a printer mechanism to print on print media;
    non-volatile memory storing diagnostic procedures that, when executed, result in diagnostic patterns being printed on said print media, said diagnostic patterns including a media-advance pattern to detect media-advance problems and a nozzle-health pattern to detect nozzle-related problems; and
    a print controller to:
        receive, in a diagnostic user interface of the printer, a selection of an image from a user;
        cause the print mechanism to print the media-advance pattern and the nozzle-health pattern concurrently with the image selected by the user on separate areas of a single print medium, wherein at least part of the media-advance pattern and at least part of the nozzle-health pattern are both printed on the single print medium between a first time when the image begins printing and a second time when printing of the image is completed;
        receive, in the diagnostic user interface, results of a comparison by the user of the media-advance pattern and the nozzle-health pattern to the image concurrently printed on the single print medium; and
        based on the results of the comparison by the user of the media-advance pattern and the nozzle-health pattern to the image concurrently printed on the single print medium, present one or more solutions in the diagnostic user interface.

11. A printer as recited in claim 10 wherein said non-volatile memory further stores a digital representation of said image.

12. A printer as recited in claim 11 wherein said image is a spitting image for exercising all nozzles of a print head.

13. A printer as recited in claim 10 wherein the media-advance pattern is a media-advance interferential pattern.

14. A printer as recited in claim 10 wherein the one or more solutions include replacing a print head.

15. A printer as recited in claim 10 wherein said printer mechanism includes a print head, wherein the one or more solutions include replacing the print head.

16. An article comprising non-transitory computer-readable storage media storing computer-executable instructions, said computer-executable instructions executable to:
    receive, in a diagnostic user interface of a printer, a selection of an image from a user;
    cause a print mechanism to print a media-advance pattern, a nozzle-health pattern, and the image on a single print medium, wherein the media-advance pattern, the nozzle-health pattern, and the image are printed concurrently to separate areas of the single print medium, wherein at least part of the media-advance pattern and at least part of the nozzle-health pattern are both printed on the single print medium between a first time when the image begins printing and a second time when printing of the image is completed, said plurality of diagnostic patterns including a media-advance pattern to detect media-advance problems and a nozzle-health pattern to detect nozzle-related problems;
    receive, in the diagnostic user interface, results of a comparison by the user of the media-advance pattern and the nozzle-health pattern to the image concurrently printed on the single print medium; and
    based on the results of the comparison by the user of the media-advance pattern and the nozzle-health pattern to the image concurrently printed on the single print medium, present one or more solutions in the diagnostic user interface.

17. An article as recited in claim 16 wherein the media-advance pattern is a media-advance interferential pattern.

18. An article as recited in claim 16 wherein the one or more solutions include executing a calibration procedure for a media-advance subsystem of the printer.

19. An article as recited in claim 18 wherein said computer-executable instructions are further executable to provide for user selection of a portion of an image to be printed concurrently with said diagnostic pattern.

20. An article as recited in claim 16 wherein a portion of said image and a portion of said diagnostic pattern are printed in the same pass of a print head, said pass being transverse with respect to direction of media advance.

* * * * *